United States Patent Office 2,822,038
Patented Feb. 4, 1958

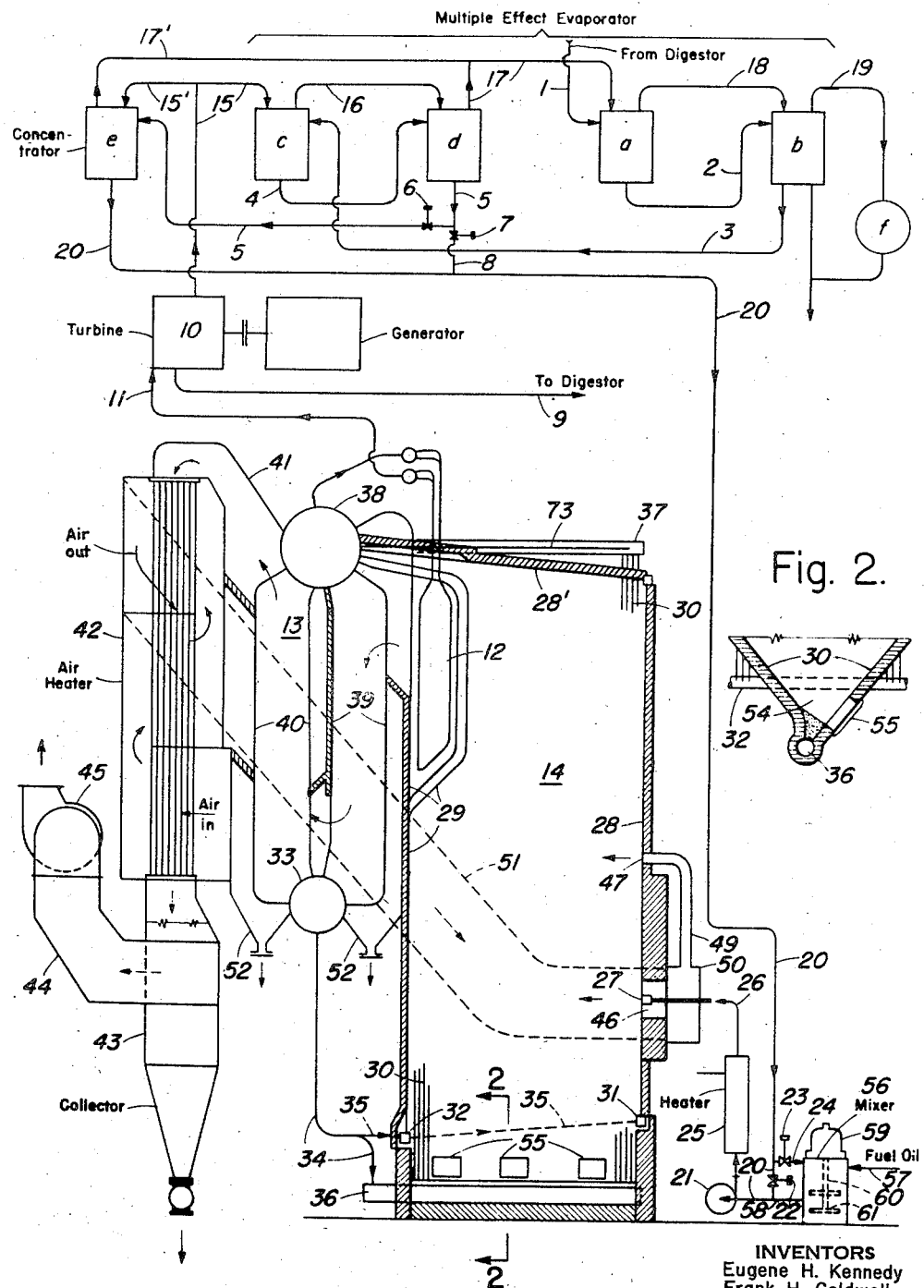

2,822,038

TREATMENT OF RESIDUAL WASTE LIQUOR FROM SULPHITE PROCESS OF MAKING PULP

Eugene H. Kennedy, Essex Fells, N. J., and Frank H. Coldwell and Truman A. Pascoe, Port Edwards, Wis.; said Coldwell and said Pascoe assignors to Nekoosa-Edwards Paper Company, a corporation of Wisconsin, and said Kennedy assignor to Combustion Engineering, Inc., a corporation of Delaware Application January 30, 1952, Serial No. 268,972

3 Claims. (Cl. 158—117.5)

This invention relates to a process for the disposal of chemical from the residual liquor obtained in the sulphite process of making pulp from cellulosic fibrous materials.

The usual treatment of the residual liquor from the digestion of cellulosic fibrous materials by an acid sulphite such as calcium sulphite, comprises evaporating the liquor to a certain concentration of dryness, then heating the liquor, then spraying it under pressure into space within a refractory lined furnace where it is further dried by evaporation, and burning the combustible organic matter of the liquor in the presence of heated air within the furnace space. The air for combustion of the dried liquor is delivered into the furnace through ports adjacent the burner and some air may be injected from other ports into the burning mass within the furnace. The ash or chemical may be removed from the furnace bottom, and that portion which is entrained by the furnace gases is removed from hoppers beyond the furnace offtake into which the chemical is deposited after separating from the furnace leaving gases. A collector may be provided to remove the remaining ash before it enters the chimney.

Upon leaving the furnace the gases usually pass over banks of convection tubes of a steam generator to which they yield heat from the generation of steam. The process is ordinarily self sustaining, that is, there is a commensurate amount of heat required to be carried into the furnace by the concentrated and heated residual liquor and by the heated air for combustion to compensate for the heat required for sufficiently drying the liquor and sustaining combustion.

Prior to its introduction into the furnace, the liquor is usually evaporated to said concentration or dryness by passing it through a series of multiple effect evaporators and a concentrator. This apparatus must be made of corrosion resisting materials to resist the attack of the acid sulphite liquor from the digester. Consequently the cost of the evaporating equipment is high and particularly so if the required sulphite concentration of the liquor to the furnace is relatively high requiring a proportional size of evaporating equipment. Such will be the case when the final solids concentration of the liquor must be relatively high to burn it in a furnace whose walls are lined with bare metallic fluid cooled surfaces.

An important object of this invention is to provide an improved technique for disposing of chemical from the residual liquor obtained from the sulphite process of making pulp from cellulosic fibrous materials whereby the size and therefore the cost of evaporating equipment is reduced and other significant advantages are realized.

Other objects and advantages of the invention will become apparent from the following description of an illustrative embodiment thereof when taken in conjunction with the accompanying drawings, wherein:

Fig. 1 is a diagrammatic elevational view of a disposal installation for chemicals from residual sulphite liquor organized in accordance with our invention and showing the furnace, boiler and air heater in cross section; and Fig. 2 is a cross section through a portion of the furnace bottom taken on line 2—2 of Fig. 1.

Liquor treating facilities to be benefitted

In the illustrative installation represented the digested pulp from a conventional digester (not shown) is passed through a conventional washer (not shown) in which the residual liquor is washed from the pulp and from which washer the liquor is withdrawn. The liquor thence passes via pipe 1 through a multiple effect evaporator which comprises a plurality of evaporator units a, b, c, d, interconnected by pipes 2, 3, 4 for serial flow of liquor therethrough. Thence the liquor may pass through a concentrator e via pipe 5 to further increase its concentration of solids. Valve 6 in pipe 5 is now open and valve 7 in pipe 8 is closed.

The digester may be supplied with steam as by means of pipe 9 leading from a suitable stage of steam turbine 10 which in turn receives its steam via pipe 11 from the superheater 12 of a boiler 13 associated with the recovery furnace 14. The multiple effect evaporator units receive their supply of steam via pipe 15 from a lower pressure stage of the steam turbine 10; the steam entering evaporator unit c, and each of the remaining units d, a, b receiving the steam evaporated from the liquor in next adjacent unit, in the order mentioned, via pipes 16, 17, 18. The operation of such evaporators is well known. The concentrator e, which is in effect another evaporator unit, receives steam via pipe 15' which connects into pipe 15. Steam evaporated from the liquor in concentrator e flows via pipes 17', 17 into evaporator a. Steam leaving evaporator b flows via pipe 19 into a condenser f.

In thus passing through the multiple effect evaporators the liquor may have its solids content raised to a density of about 52% of solids, and this liquor after passing through the concentrator e may have its density further raised to about 65% solids. Although a concentration of 52% of solids in the calcium base sulphite liquor may be adequate to sustain combustion in a refractory furnace or in a fluid cooled tubular furnace faced with refractory, experience shows that the concentration of said liquor must be raised to about 65% of solids to sustain combustion in a furnace lined with bare metallic fluid cooled surfaces.

In the system represented the highly concentrated liquor flows from the concentrator e via pipe 20 to a pump 21; this happening when the valve 22 in line 20 is open and the valve 23 in line 24 is closed. The pump 21 delivers the liquor under pressure through a heater 25 and thence via pipe 26 through nozzle of burner 27 into the furnace 14. Said concentrated liquor has a viscosity which at ordinary room temperature is so high that effective spraying through burner nozzle 27 cannot be achieved; heater 25 suitably raises the liquor temperature before delivery to the burner and thus overcomes such difficulty.

The recovery furnace 14 has its walls lined with upright front and rear wall tubes 28, 29 and side wall tubes 30, all of which are cooled by boiler water and all of which are bare. In the arrangement illustrated the wall tubes 28 and 29 are connected at their bottom ends to bottom headers 31, 32 which receive water from the bottom drum 33 of the boiler 13 via downcomer tubes 34, 35; the side wall tubes 30 receive water from header 36 which is supplied by downcomer 34; the top ends of the side wall tubes 30 are connected into top headers 37 adjacent both walls, which discharge steam and water into the steam drum 38 of boiler 13 via tubes 73; and the front wall tubes 28 discharge steam and water into steam drum 38 via roof tubes 28' while the rear wall tubes 29 discharge directly into drum 38.

The boiler here shown at 13 is provided with upright banks of water tubes 39 and 40 connected into drums 38 and 33 and is baffled to provide a down pass for the furnace leaving gases through bank 39 and an up pass through bank 40. The gas thence flows through duct 41 into the air heater 42, thence through the air heater and into the collector 43 whence it flows through breeching 44 to fan 45 by which it is discharged into a chimney (not shown).

As above mentioned, the highly concentrated liquor is introduced (from pump 21) into the furnace under pressure through the burner 27. The burner sprays the liquor in divided particles into space within the furnace where its combustible constituents burn. The remaining water in the liquor is evaporated from the liquor while it is floating through the furnace in the presence of the burning combustible matter of the liquor previously introduced. Heated air for combustion is admitted into the furnace through opening 46 adjacent the burner 27. Heated air may also be admitted into the furnace by nozzles such as 47 to burn unconsumed combustible matter in space within the furnace. In the arrangement shown said heated air is delivered to the nozzles 47, and to the opening 46 adjacent the burner 27, via air conduits 49, 50 respectively; the latter air conduit 50 being connected via duct 51 to the air heater 42. The aforesaid air is forced through the air heater 42 in a well known manner by a forced draft fan, not shown.

The products of combustion rise in counterflow to the falling sprayed liquor particles to which they yield heat for drying, and while flowing upwardly through the furnace also yield heat to the wall tubes to generate steam. A substantial portion of the ash or chemical may be entrained by the furnace leaving gases and will separate out into hoppers such as hoppers 52 under the boiler passes 39 and 40 and be caught by collector 43. Any remainder settling out in the furnace may be removed from the furnace hopper bottom 54 as through cleanout doors shown at 55 in Fig. 2.

The improvements of our invention

We have discovered that sulphite liquor, such as calcium bi-sulphite liquor, will easily mix with light fuel oil within a few minutes; that such sulphite liquor is a natural dispersing agent and forms a stable emulsion with the oil; that this liquor once mixed will not separate from the oil after standing for several days; and that the emulsion will not break up upon heating. Such emulsifying properties are quite unexpected inasmuch as all attempts to mix fuel oil with waste liquor from the sulphate or "kraft" process of pulp manufacture have met with total failure.

We have further discovered that this mixture of said sulphite waste liquor and fuel oil may be efficiently burned in a furnace by means of an oil burner of relatively conventional construction (represented at 27) and that the concentration of solids in the liquor in said mixture may be substantially reduced below the value usually required (at least 65%) when the liquor alone is burned.

Consequently, when burning said mixture, the reduced concentration of the liquor permits a substantial reduction in costly evaporator equipment (shown at a—b—c—d—e— in Fig. 1). Furthermore, no separate burners are required for auxiliary fuel. By way of example, we have found that liquor concentrated to about 52% solids content may be mixed with a diesel fuel oil in the ratio of about 0.2 pound of oil to 1 pound of liquor, and be burned successfully within a furnace fully lined with bare metallic fluid-cooled surfaces. We believe that a finer atomization of the oil-liquor mixture by the burner may permit a liquor of still lower solids content to be burned on the self-sustaining basis here under discussion.

Referring to Fig. 1, the multiple effect evaporators a, b, c, d, will concentrate the liquor to about 50% to 52% solids, which is the concentration referred to above. The concentrator e and its associated piping may therefore be omitted; and since this omitted concentrator e is made of a corrosion resistant material, such as stainless steel, there results a material saving in the original cost and in the maintenance of this apparatus. The concentrated liquor now leaves the evaporator d, flows via pipes 5, 8, 20, 24 directly into a mixing tank 56 into which the fuel oil is introduced via pipe 57 from a source not shown; valves 7 and 23 of Fig. 1 now being open and valves 6 and 22 now being closed.

Means are provided in the mixing tank 56 to thoroughly mix the liquor and oil. Such means may take the form of a motor 59 upon whose shaft 60 are mounted paddles 61. From the mixing tank 56 the mixture of liquor and oil is conducted via pipes 58 and 20 to pump 21 and thence through heater 25 and pipe 26 to the burner 27 whence it is sprayed into the furnace to be burned therein; such burning affording the very practical advantages earlier outlined.

Among such advantages are: (1) eliminating the previously existing need for evaporating equipment made more expensive by inclusion of element e as heretofore necessary to concentrate the sulphite liquor from the around 50% solids content leaving evaporator unit d to the some 65% solids content required for self-supporting combustion in a water-cooled furnace such as is illustratively shown at 14; (2) dispensing with the separate auxiliary fuel burner (for oil, pulverized coal or the like) previously needed to sustain combustion of low-solids sulphite liquor in a water cooled furnace, and accomplishing such burning by means only of the main liquor burners 27 (which may be mechanical or steam atomizing) supplied through heater 25 and pump 21 (already present in a conventional system) with the low-solids liquor plus enriching fuel oil added thereto in accordance with this invention either in the mixing tank illustratively shown at 56 or in the conventional storage tank for said low-solids liquor; and (3) assuring that the chemical ash from the burned sulphite liquor will be cleaner and whiter (and hence more suitable for recovery and reuse in the pulp making process or elsewhere) than were some auxiliary fuel other than oil (such as pulverized coal) to be employed.

While we have illustrated and described the invention applied to a furnace fully lined with bare metallic fluid cooled surfaces, it will be understood that the invention may be equally advantageously applied to a refractory faced furnace with a commensurate saving in evaporating equipment, and that changes may be made in the form of the apparatus disclosed without departing from the spirit of the invention defined by the claims.

What we claim is:

1. In the continuous process of disposing of the residual liquor from digestion of wood pulp with calcium bi-sulphite, in which process said liquor is concentrated and then substantially continuously sprayed into a furnace for burning therein of the combustible matter in said liquor, the steps of evaporating said liquor prior to its introduction into said furnace to a concentration of solids containing substantially less combustible matter than that required for self sustaining combustion within said furnace, admixing into said liquor a liquid fuel capable of forming an emulsion with said liquor and in amount sufficient to assure self sustaining combustion in said furnace and with sufficient agitation and for a sufficient time to form an emulsion, transporting this emulsion through a substantial distance to the furnace for spraying thereinto, heating said emulsion of liquor and fuel during this transportation by passing it through an indirect heat exchanger so as to reduce its viscosity before attempting to divide the emulsion into small particles for projection into a furnace, thereafter, continuously spraying said heated emulsion into said furnace and burning the same therein.

2. In the continuous process of disposing of the residual liquor from digestion of wood pulp with calcium bi-sulphite, in which process said liquor is concentrated and then substantially continuously sprayed into a furnace for burning therein of the combustible matter in said liquor, the steps of evaporating said liquor prior to its introduction into said furnace to a concentration of solids of about 52% and containing substantially less combustible matter than that required for self sustaining combustion within said furnace, admixing a light fuel oil into said liquor in amount sufficient to assure self sustaining combustion in said furnace and with sufficient agitation and for a sufficient time to form an emulsion, transporting this emulsion through a substantial distance to the furnace for spraying thereinto, heating said emulsion of liquor and fuel oil during this transportation by passing it through an indirect heat exchanger so as to reduce its viscosity before attempting to divide the emulsion into small particles for projection into a furnace, thereafter, continuously spraying said heated emulsion into said furnace and burning the same therein.

3. In the continuous process of disposing of the residual liquor from digestion of wood pulp with calcium bisulphite, in which process said liquor is concentrated and then substantially continuously sprayed into a furnace for burning therein of the combustible matter in said liquor, the steps of evaporating said liquor prior to its introduction into said furnace to a concentration of solids of approximately 52% and containing substantially less combustible matter than that required for self sustaining combustion within said furnace, admixing with said liquor about 0.2 pound of light fuel oil for each pound of liquor and with sufficient agitation and for a sufficient time to form an emulsion, transporting this emulsion through a substantial distance to the furnace for spraying thereinto, heating said emulsion of liquor and fuel oil during this transportation by passing it through an indirect heat exchanger so as to reduce its viscosity before attempting to divide the emulsion into small particles for projection into a furnace, thereafter, continuously spraying said heated emulsion into said furnace and burning the same therein.

References Cited in the file of this patent

UNITED STATES PATENTS

| Number | Name | Date |
|---|---|---|
| 418,273 | Cloudman | Dec. 31, 1889 |
| 418,274 | Cloudman | Dec. 31, 1889 |
| 1,795,357 | Allen | Mar. 10, 1931 |
| 1,988,473 | Bennett | Jan. 22, 1935 |
| 2,319,591 | Ferguson | May 18, 1943 |
| 2,667,848 | Silk | Feb. 2, 1954 |